United States Patent [19]
Hughes et al.

[11] 3,870,725
[45] Mar. 11, 1975

[54] NITROTHIAZOLE DERIVATIVES

[75] Inventors: Peter Graham Hughes, Sunningdale; John Pomfret Verge, Middle Assendon, both of England

[73] Assignee: Lilly Industries Limited, London, England

[22] Filed: Mar. 13, 1972

[21] Appl. No.: 234,376

[30] Foreign Application Priority Data
Mar. 30, 1971  Great Britain...................... 8252/71
Aug. 20, 1971  Great Britain................... 39106/71

[52] U.S. Cl.. 260/302 H, 260/248 AS, 260/248 CS, 260/250 A, 260/250 P, 260/256.5 R, 260/288 R, 260/293.85, 260/294.8 D, 260/249, 260/250, 260/251, 260/258, 260/263, 260/270
[51] Int. Cl............................................ C07d 99/10
[58] Field of Search.... 260/302 SD, 302 H, 294.8 D

[56] References Cited
UNITED STATES PATENTS
2,744,908   5/1956   Young.......................... 260/302 SD
FOREIGN PATENTS OR APPLICATIONS
39-12643   8/1964   Japan Primary Examiner—R. J. Gallagher
Attorney, Agent, or Firm—Kathleen R. S. Page; Everet F. Smith

[57] ABSTRACT

5-Nitrothiazoles substituted in the 2-position by a heteroaromatic thio group are useful as plant fungicides and have activity against various fungi pathogenic to animals such as Candida and dermatophytes. The compounds are prepared by condensation of a 2-halo-5-nitrothiazole with a salt of the appropriate mercapto substituted heteroaromatic compound.

4 Claims, No Drawings

NITROTHIAZOLE DERIVATIVES

This invention relates to thiazolyl sulphides and their use as antifungal agents. The invention also provides fungicidal compositions comprising said thiazolyl sulphides and a process by which these thiazolyl sulphides and said compositions may be prepared.

According to the present invention, there are provided thiazolyl sulphides of the formula:

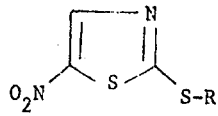   I and the corresponding sulphones, wherein R is a heteroaromatic group linked through a carbon atom to the nitrothiazolyl sulphide moiety, said group being:

i. a monocyclic five-membered ring having 3 or 4 hetero ring atoms, two of which are nitrogen and the remainder of which are selected from nitrogen, oxygen and sulphur; or ii. a monocyclic or fused bicyclic six to ten-membered ring having 1 to 4 hetero ring atoms, one of which is nitrogen and the remainder of which are selected from nitrogen and oxygen.

The heteroaromatic group may, if desired, bear one or more substituents which do not substantially affect the anti-fungal activity of the compound of formula I. Exemplary of such substituents are $C_{1-10}$ alkyl, $C_{2-6}$ alkenyl, $C_{2-6}$ alkynyl, phenyl-$C_{1-6}$ alkyl, hydroxy-$C_{1-6}$ alkyl, halo-$C_{1-6}$ alkyl, $C_{1-6}$ alkylthio, $C_{2-6}$ alkenylthio, $C_{2-6}$ alkynylthio, phenyl-$C_{1-6}$ alkylthio, hydroxy-$C_{1-6}$ alkylthio, $C_{1-6}$ alkylthiocarbbamylthio, phenyl, cyclohexyl, pyridyl, piperidinyl, $C_{1-6}$ alkylamino, amino, nitro, mercapto, hydroxyl, a halogen atom, an oxygen atom (forming a ketone or N-oxide) or a sulphur atom (forming a thione).

By the term "$C_{1-10}$ alkyl" as used herein is meant a straight or branched chain saturated hydrocarbon group having from 1 to 10 carbons such as methyl, ethyl, isopropyl, n-butyl, s-butyl, t-butyl, n-amyl, isoamyl, n-hexyl, n-octyl and n-decyl. The term "$C_{1-6}$ alkyl" means the aforementioned alkyl groups having up to 6 carbons. The terms "$C_{2-6}$ alkenyl" and "$C_{2-6}$ alkynyl" are used to mean straight or branched chain hydrocarbon groups having from 2 to 6 carbons and unsaturated by a double or triple bond respectively, such as vinyl, allyl, propargyl, 1-methylvinyl, but-1-enyl, but-2-enyl, but-2-ynyl, 1 methylbut-2-enyl, pent-1-enyl, pent-3-enyl, 3-methylbut-1-ynyl, 1,1-dimethylallyl, hex-2-enyl and 1-methyl-1-ethylallyl. The term "phenyl-$C_{1-6}$ alkyl" means the aforementioned $C_{1-6}$ alkyl groups substituted by a phenyl group such as benzyl, phenethyl, phenopropyl, 1-benzylethyl, phenobutyl and 2-benzylpropyl. The term "hydroxy-$C_{1-6}$ alkyl" means the aforementioned $C_{1-6}$ alkyl groups substituted by a single hydroxyl group such as 2-hydroxyethyl, 2-hydroxypropyl, 3-hydroxypropyl, 4-hydroxybutyl, 1-hydroxybutyl and 6-hydroxyhexyl. The terms "$C_{1-6}$ alkylthio, $C_{2-6}$ alkenylthio, $C_{2-6}$ alkynylthio, alkynlthio, hydroxy-$C_{1-6}$ alkylthio and phenyl-$C_{1-6}$ alkylthio" as used herein mean the aforementioned $C_{1-6}$ alkyl, $C_{2-6}$ alkenyl, $C_{2-6}$ alkynyl, hydroxy-$C_{1-6}$ alkyl and phenyl-$C_{1-6}$ alkyl groups linked through a sulphur atom to group R. The terms "$C_{1-6}$ alkylthiocarbamylthio and $C_{1-6}$ alkylamino" are used respectively to denote the groups:

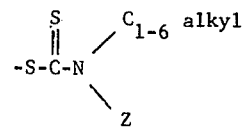

and

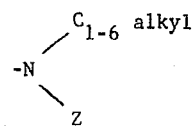

where Z is hydrogen or $C_{1-6}$ alkyl.

In accordance with a feature of the present invention, a preferred group of compounds of formula I are those where R is:

i. a monocyclic group selected from thiadiazolyl, oxadiazolyl, triazolyl and tetrazolyl, said group being optionally substituted as defined above; or ii. a monocyclic or fused bicyclic group optionally substituted as defined above and having respectively 6 or 10 ring atoms, one to three of which are nitrogen atoms.

Exemplary of structures falling within group (ii) above are:

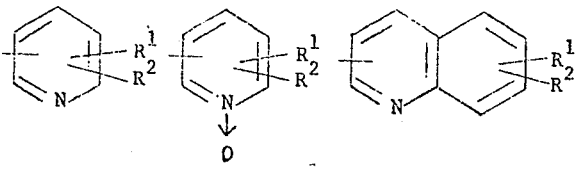

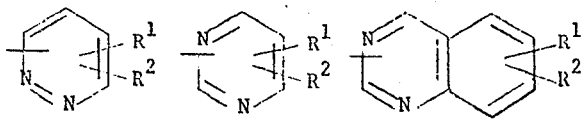

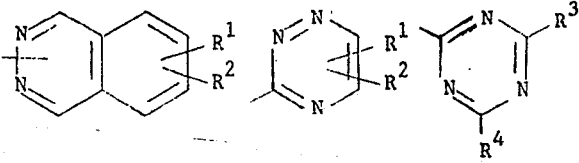

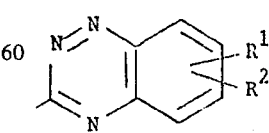

where $R^1$ and $R^2$ are independently hydrogen, $C_{1-4}$ alkyl, phenyl, 1-piperidinyl, nitro or hydroxyl, and $R^3$ and $R^4$ are independently halogen, amino or $C_{1-4}$ alkylamino.

Exemplary of preferred structures falling within group (i) above are:

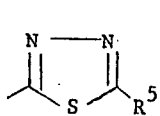 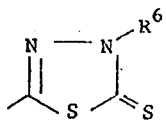 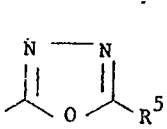

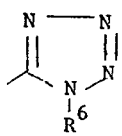 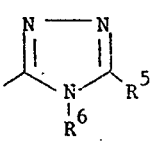

where $R^5$ is hydrogen, $C_{1-4}$ alkyl, $C_{1-10}$ alkylthio, $C_{2-4}$ alkenylthio, $C_{2-4}$ alkynylthio, $C_{1-4}$ hydroxyalkylthio, phenyl-$C_{1-4}$ alkylthio, $C_{1-4}$ alkylthiocarbamylthio, $C_{1-4}$ alkylamino, amino, mercapto, pyridyl or phenyl, and $R^6$ is hydrogen, $C_{1-4}$ alkyl, $C_{2-4}$ alkenyl, phenyl, phenyl-$C_{1-4}$ alkyl, or cyclohexyl.

The compounds of formula I may readily be prepared by condensing a 2-halo-5-nitrothiazole, preferably 2-bromo-5-nitrothiazole, with a mercapto derivative of the heteroaromatic compound, the mercapto compound being in the form of a salt or, if a free mercapto compound is used, the reaction being carried out in the presence of a base. Suitable salts of the mercapto compound are alkali metal, alkaline earth metal and tertiary amine salts, especially the sodium and pyridinium salts, whilst suitable bases include alkali metal hydroxides, carbonates, bicarbonates and alkoxides, alkaline earth metal hydroxides and tertiary amines, especially sodium hydroxide, sodium methoxide, sodium ethoxide and pyridine. The reaction is preferably carried out in a suitable solvent or mixture of solvents such as acetone, methanol, ethanol and pyridine and proceeds at room temperature although, in order to shorten the reaction time, elevated temperatures of from 45°C. up to the reflux temperature of the reaction mixture are preferred.

The sulphones of formula I are prepared by conventional oxidation of the corresponding sulphides, for example, using a peracid or salt thereof such as peracetic acid, sodium periodate or m-chlorobenzoic acid.

The following compounds are illustrative of those which can be produced by the above mentioned process:

5-nitro-2-thiazolyl-5'-methyl-1',3',4'-thiadiazolyl sulphide
5-nitro-2-thiazolyl-5'-methyl-1',3',4'-thiadiazolyl sulphone
5-nitro-2-thiazolyl-5'-t-butyl-1',3',4'-thiadiazolyl sulphide
5-nitro-2-thiazolyl-5'-phenyl-1', 3',4'-thiadiazolyl sulphide
5-nitro-2-thiazolyl-5'-mercapto-1', 3',4'-thiadiazolyl sulphide
5-nitro-2-thiazolyl-5'-thiomethyl-1',3',4'-thiadiazolyl sulphide
5-nitro-2-thiazolyl-5'-thiomethyl-1',3',4'-thiadiazolyl sulphone
5-nitro-2-thiazolyl-5'-thioethyl-1',3',4'-thiadiazolyl sulphide
5-nitro-2-thiazolyl-5'-thiohexyl-1',3',4'-thiadiazolyl sulphide
5-nitro-2-thiazolyl-5'-thioallyl-1',3',4'-thiadiazolyl sulphide
5-nitro-2-thiazolyl-5'-(N,N-dimethylthiocarbamylthio)-1',3',4'-thiadiazolyl sulphide
5-nitro-2-thiazolyl-5'-β-hydroxyethylthio)-1',3',4'-thiadiazolyl sulphide
5-nitro-2-thiazolyl-5'-(4'''-pyridyl)-1',3',4'-thiadiazolyl sulphide
5-nitro-2-thiazolyl-5'-thiobenzyl-1',3',4'-thiadiazolyl sulphide
5-nitro-2-thiazolyl-5'-thiobenzyl-1',3',4'-thiadiazolyl sulphone
5-nitro-2-thiazolyl-5'-(N,N-diethylthiocarbamylthio)-1',3',4'-thiadiazolyl sulphide
5-nitro-2-thiazolyl-5'-thiopropargyl-1',3',4'-thiadiazolyl sulphide
5-nitro-2-thiazolyl-5'-amino-1',3',4'-thiadiazolyl sulphide
5-nitro-2-thiazolyl-5'-(N,N-dimethylamino)-1',3',4'-thiadiazolyl sulphide
5-nitro-2-thiazolyl-5'-(N,N-diethylamino)-1',3',4'-thiadiazolyl sulphone
5-nitro-2-thiazolyl-4'-phenyl-5'-thione-1',3',4'-thiadiazolyl sulphide
5-nitro-2-thiazolyl-4'-allyl-5'-thione-1',3',4'-thiadiazolyl sulphide
5-nitro-2-thiazolyl-4'-methyl-5'-thione-1',3',4'-thiadiazolyl sulphide
5-nitro-2-thiazolyl-4'-benzyl-5'-thione-1',3',4'-thiadiazolyl sulphide
2-(5'-nitro-2'-thiazolylthio)-4-methyl-1,3,4-thiadiazolyl-5-one
2-(5'-nitro-2'-thiazolylthio)-4-phenyl-1,3,4-thiadiazolyl-5-one
2-(5'-nitro-2'-thiazolylthio)-4-cyclohexyl-1,3,4-thiadiazolyl-5-one
5-nitro-2-thiazolyl-5'-(2'''-pyridyl)-1',3',4'-oxadiazolyl sulphide
5-nitro-2-thiazolyl-5'-(4'''-pyridyl)-1',3',4'-oxadiazolyl sulphide 5-nitro-2-thiazolyl-5'-phenyl-1',3',4'-oxadiazolyl sulphide
5-nitro-2-thiazolyl-5'-phenyl-1',3',4'-oxadiazolyl sulphone
5-nitro-2-thiazolyl-5'-methyl-1',3',4'-oxadiazolyl sulphide
5-nitro-2-thiazolyl-5'-thioethyl-1',3',4'-oxadiazolyl sulphide
5-nitro-2-thiazolyl-5'-thioallyl-1',3',4'-oxadiazolyl sulphide
5-nitro-2-thiazolyl-5'-thiobenzyl-1',3',4'-oxadiazolyl sulphide
5-nitro-2-thiazolyl-5'-thiobenzyl-1',3',4'-oxadiazolyl sulpone
5-nitro-2-thiazolyl-5'-(N,N-dimethylthiocarbamylthio)-1',3',4'-oxadiazolyl sulphide
5-nitro-2-thiazolyl-5'-ethyl-1',3',4'-oxadiazolyl sulphide
2-(5'-nitro-2'-thiothiazolyl)-4-methyl-1,3,4-oxadiazol-5-one
5-nitro-2-thiazolyl-3'-phenyl-4'-ethyl-1',2',4'-triazolyl sulphide
5-nitro-2-thiazolyl-3'-phenyl-4'-ethyl-1',2',4'-triazolyl sulphone 5-nitro-2-thiazolyl-3'-amino-4'-phenyl-1',2',4'-triazolyl sulphide
5-nitro-2-thiazolyl-3'-(N,N-dimethylamino)-4'-benzyl-1',2',4'-triazolyl sulphide
5-nitro-2-thiazolyl-3'-thiomethyl-4'-t-butyl-1',2',4'-triazolyl sulphide
5-nitro-2-thiazolyl-3'-ethyl-5'-(1,2,4-triazolyl)sulphide
5-nitro-2-thiazolyl-3'-ethyl-5'-(1,2,4-triazolyl)sulphide  5-nitro-2-thiazolyl-3'-ethyl-5'-(1,2,4-triazolyl)sulphone
5-nitro-2-thiazolyl-3'-isopropyl-5'-(1,2,4-triazolyl)sulphide
5-nitro-2-thiazolyl-4'-methyl-3'-(1,2,4-triazolyl)sulphide
5-nitro-2-thiazolyl-4'-vinyl-3'-(1,2,4-triazolyl)sulphide
5-nitro-2-thiazolyl-4'-benzyl-3'-(1,2,4-triazolyl)sulphide
5-nitro-2-thiazolyl-3'-(4''-pyridyl)-5'-(1,2,4-triazolyl)sulphide
5-nitro-2-thiazolyl-1'-phenyl-1'H-tetrazolyl sulphide
5-nitro-2-thiazolyl-1'-phenyl-1'H-tetrazolyl sulphone
5-nitro-2-thiazolyl-1'-benzyl-1'H-tetrazolyl sulphone
5-nitro-2-thiazolyl-1'-methyl-1'H-tetrazolyl sulphide
5-nitro-2-thiazolyl-1'-allyl-1'H-tetrazolyl sulphide
5-nitro-2-thiazolyl-1'-cyclohexyl-1'H-tetrazolyl sulphide
5-nitro-2-thiazolyl-1'H-tetrazolyl sulphide
5-nitro-2-thiazolyl-2'-pyridyl sulphide
5-nitro-2-thiazolyl-4'-pyridyl sulphide
5-nitro-2-thiazolyl-4'-pyridyl sulphone
5-nitro-2-thiazolyl-4'-methyl-2'-pyridyl sulphide
5-nitro-2-thiazolyl-5'-nitro-2'-pyridyl sulphide
5-nitro-2-thiazolyl-2'-(pyridyl-N-oxide) sulphide
5-nitro-2-thiazolyl-2'-quinolyl sulphide
5-nitro-2-thiazolyl-6',7'-dimethyl-2'-quinolyl sulphide
5-nitro-2-thiazolyl-4'-(pyridyl-N-oxide) sulphide
5-nitro-2-thiazolyl-4'-(pyridyl-N-oxide) sulphone
5-nitro-2-thiazolyl-2'-pyrimidinyl sulphide
5-nitro-2-thiazolyl-4'-piperidino-2'-pyrimidinyl sulphide
5-nitro-2-thiazolyl-4'-methyl-2'-pyrimidinyl sulphide
5-nitro-2-thiazolyl-4',6'-dimethyl-2'-pyrimidinyl sulphide
5-nitro-2-thiazolyl-4'-methyl-6'-hydroxy-2'-pyrimidinyl sulphide
5-nitro-2-thiazolyl-4'-pyridazinyl sulphide
5-nitro-2-thiazolyl-4'-quinazolinyl sulphide
5-nitro-2-thiazolyl-6',7'-dimethyl-4'-quinazolinyl sulphide
5-nitro-2-thiazolyl-1'-phthalazinyl sulphide
5-nitro-2-thiazolyl-4'-phenyl-1'-phthalazinyl sulphide
5-nitro-2-thiazolyl-3'-(1,2,4-triazinyl) sulphide
5-nitro-2-thiazolyl-5',6'-diphenyl-3'-(1,2,4-triazinyl) sulphide
5-nitro-2-thiazolyl-4',6'-diamino-2'-(1,3,5-triazinyl) sulphide
5-nitro-2-thiazolyl-4',6'-dichloro-2'-(1,3,5-triazinyl) sulphide The appropriate mercapto substituted heteroaromatic compounds, which are reacted with a 2-halo-5-nitrothiazole to form the above compounds, are for the most part known compounds. Any that are not are prepared by methods analogous to those used for preparing the known mercapto intermediate compounds. Full details of appropriate methods for preparing these mecapto intermediates can readily be obtained from standard chemical text books such as "Heterocyclic Compounds" published by John Wiley and Sons, "The Chemistry of Heterocyclic Compounds" published by Interscience, and "Advances in Heterocyclic Chemistry" published by Academic Press.

As stated above, the compounds of this invention are useful as fungicides and in particular show useful activity against a variety of fungi which attack economically valuable plant life such as *Alternaria tenuis*, *Botrytis cinerea*, *Colletotrichum sp.* such as *C. atramentarium*, *Penicillium expansum* and *Peronospora sp.* The compounds also possess useful activity against various fungi pathogenic to animals, including humans, such as fungi in the genus Candida, especially *C. albicans*, and dermatophytes such as *Trichophyton mentagrophytes*.

Accordingly the present invention in a further aspect provides a method of treating plants susceptible to or suffering from fungal attack which comprises applying to said plants a fungicidal amount of a compound of formula I. The compounds may be applied to the foliage of crops and plants, and/or to the soil or water in which the plants are growing, in order to partially or totally eradicate the aforementioned plant pathogenic fungi as well as to prevent attack by such fungi. Normally the compounds will be applied in the form of fungicidal compositions. According therefore to another aspect of the present invention, there is provided a fungicidal composition comprising the active ingredient in association with a non-phytotoxic diluent or carrier material and a process for preparing such fungicidal compositions comprising mixing a fungicidally-active ingredient of formula I with said diluent or carrier material. The latter may be, for example, one or more of water, alcohols, glycols, glycol-ethers, petroleum distillates and various dispersion media such as surfactants, emulsifiers and finely divided inert solids. The concentration of the active ingredient in these compositions will vary depending on whether the composition is to be used directly as a dust or is intended as an emulsifiable concentrate or wettable powder designed to be subsequently diluted for example with water prior to use.

Since in use the compounds will normally be applied to infected or susceptible plants as compositions containing from about 5 to 3,000 p.p.m., preferably from about 200 to 2,000 p.p.m., of the active ingredient, it is normally convenient for ease of formulation, storage, package, etc., to formulate the active ingredient as a liquid or solid concentrate composition.

Liquid concentrates may be prepared by dissolving, dispersing or suspending from 0.1 to 50% of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products of alkylene oxides with phenols and organic acids, polyoxyethylene derivatives of sorbitan esters, complex ether-alcohols and the like.

Solid concentrate mixtures may be prepared by incorporating from 5 to 90% of the active ingredient in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The active ingredient of the invention may also be incorporated in tablets, pellets, capsules or formulated as aerosols or sprays to ensure that the fungicidal action can be obtained at the locus of the disease.

The present invention also provides a method of treating fungal infections in animals which comprises applying to the locus of the fungus or administering to the animal suffering from the fungal infection an effective dose of an active ingredient of formula I. To administer or apply the active ingredient, it will normally be necessary to present the active compound of formula I in the form of a pharmaceutical composition comprising the active ingredient in association with a pharmaceutically acceptable diluent or carrier therefor. Such pharmaceutical compositions also form a part of this invention. The type of composition will of course depend on the proposed mode of use. Thus, for internal administration to animals, including humans, the compositions will include tablets, capsules, powders, suppositories, suspensions and injection solutions. Such compositions will normally contain from 5 to 1,000 mg. of the active ingredient and will be administered in such a way as to provide the subject requiring treatment with from 0.1 to 30 mg./kg. per day. For external use, the compositions may be in the form of creams, ointments, tinctures and emulsions which will normally contain, in concentrate form, from 0.5 to 50% by weight of the active ingredient. It will, of course, readily be understood that the amount of active ingredient actually to be administered will be determined by a physician in the light of all the relevant circumstances including the condition of the patient who is to be treated, the infection being suffered and the route of administration. Accordingly, the above preferred dosage range is not intended to limit the scope of the present invention in any way.

The formulations of the present invention normally will consist of at least one compound of formula I mixed with a carrier, or diluted by a carrier, or enclosed or encapsulated by an ingestible carrier in the form of a capsule, sachet, cachet, paper or other container or by a disposable container such as an ampoule. A carrier or diluent may be a solid, semi-solid or liquid material, which serves as a vehicle, excipient or medium for the active therapeutic substance.

Some examples of the diluents or carriers which may be employed in the pharmaceutical compositions of the present invention are lactose, dextrose, sucrose, sorbitol, mannitol, propylene glycol, liquid paraffin, white soft paraffin, kaolin, microcrystalline cellulose, calcium silicate, silica polyvinylpyrrolidone, cetostearyl alcohol, starch, gum acacia, calcium phosphate, cocoa butter, oil of theobroma, arachis oil, alginates, tragacanth, gelatin, syrup B.P., methyl cellulose, polyoxyethylene sorbitan monolaurate, ethyl lactate, methyl- and propylhydroxybenzoate, sorbitan trioleate, sorbitan sesquioleate and oleyl alcohol.

The following Examples will further illustrate the preparation of compounds of formula I:

EXAMPLE 1

5-Methyl-2-mercapto-1,3,4-thiadiazole sodium salt (0.02 mole) — prepared by reaction of thioacetamide, hydrazine and carbon disulphide under basic conditions followed by cyclisation using concentrated sulphuric acid — was dissolved in ethanol (35 ml.) and 5-nitro-2-bromothiazole (0.02 mole) in acetone (20 ml). was added dropwise over 3 minutes. The mixture was then heated on a steam bath at 50°C. and then stirred for 1 hour during which the reaction mixture was allowed to cool to room temperature. The mixture was poured in ice/water (400 ml.), stirred for 1 hour, the precipitate collected, washed with water and dried. On recrystallisation from 80% aqueous ethanol, 5-nitro-2-thiazolyl-5'-methyl-2'-(1,3,4-thiadiazolyl)sulphide, m.p. 127°–128°C., was obtained. This was oxidised to the corresponding sulphone as follows:

The sulphide (0.008 mole) was dissolved in glacial acetic acid (30 ml.) and a 30% solution of hydrogen peroxide (5 ml.) was added. The reaction mixture was heated at 70°C. until thin layer chromatography showed the absence of starting material (about 3 hours). The acetic acid was evaporated off under vacuum, water added and the mixture stirred overnight. The crystallised product was collected and dried to yield 5-nitro-2-thiazolyl-5'-methyl-2'-(1,3,4-thiadiazolyl)sulphone, which gave satisfactory microanalytical results.

By the same method, 5-nitro-2-thiazolyl-5'-(4''-pyridyl)-2'-(1,3,4-thiadiazolyl)sulphide, m.p. 204°–205°C., was prepared.

EXAMPLE 2

5-(N,N-Dimethylthiocarbamylthio)-2-mercapto-1,3,4-thiadiazole (0.03 mole) — prepared by reaction of hydrazine and carbon disulphide under basic conditions to form 2,5-dimercapto-1,3,4-thiadiazole followed by reaction with N,N-dimethylthiocarbamyl chloride in the presence of potassium hydroxide — was dissolved in acetone (25 ml.) and pyridine (0.03 mole) added. To this mixture being stirred at room temperature was added 5-nitro-2-bromothiazole (0.03 mole) in acetone (25 ml.) over a period of 3 minutes. The mixture was then refluxed for 1 hour, cooled and poured into ice/water (400 ml.). After stirring for 1 hour, the precipitate was collected, washed and dried to yield 5-nitro-2-thiazolyl-5'-(N,N-dimethylthiocarbamylthio)-2'-(1,3,4-thiadiazolyl)sulphide, m.p. 158°–159°C.

By the same method, the following compounds were prepared from the corresponding 5-substituted-2-mercapto-1,3,4-thiadiazoles (the latter themselves being prepared by reaction of the above-mentioned 2,5-dimercapto compound with the appropriate dialkylthiocarbamyl, alkyl, alkenyl or phenylalkyl halide):

5-nitro-2-thiazolyl-5'-thiomethyl-2'-(1,3,4-thiadiazolyl)sulphide, m.p. 125°–126°C.

5-nitro-2-thiazolyl-5'-thioethyl-2'-(1,3,4-thiadiazolyl)sulphide, m.p. 86°–87°C.

5-nitro-2-thiazolyl-5'-thiohexyl-2'-(1,3,4-thiadiazolyl)sulphide, m.p. 50°C.

5-nitro-2-thiazolyl-5'-thioallyl-2'-(1,3,4-thiadiazolyl)sulphide, m.p. 65°–66°C.

5-nitro-2-thiazolyl-5'-thiobenzyl-2'-(1,3,4-thiadiazolyl)sulphide, m.p. 88°–89°C.

5-nitro-2-thiazolyl-5'-thio-n-decyl-2'-(1,3,4-thiadiazolyl)sulphide, m.p. 69°–70°C.

5-nitro-2-thiazolyl-5'-(N,N-diethylthiocarbamylthio)-2'-(1,3,4-thiadiazolyl)sulphide, m.p. 131°–133°C.

EXAMPLE 3

The potassium salt of 5-amino-2-mercapto-1,3,4-thiadiazole — prepared by heating thiosemicarbazide with carbon disulphide in the presence of potassium hydroxide — was reacted as in Example 1 with 5-nitro-2-bromothiazole to yield 5-nitro-2-thiazolyl-5'-amino-2'-(1,3,4-thiadiazolyl)sulphide, m.p. 175°–176°C. Similarly by starting with N,N-dimethyl- or N,N-diethyl-thiosemicarbazide, there were obtained respectively 5-nitro-2-thiazolyl-5'-(dimethylamino)- and 5'-(diethylamino)-2'-(1,3,4-thiadiazolylsulphides, both of which gave satisfactory microanalytical results.

EXAMPLE 4

By reaction of the potassium salt of 2-mercapto-4-phenyl-5-thione-1,3,4-thiadiazole (prepared by reaction of carbon disulphide with the potassium salt of N-phenyldithiocarbazoic acid) with 5-nitro-2-bromothiazole, using the method of Example 1, there is obtained 2-(5'-nitro-2'-thiothiazolyl)-4-phenyl-1,3,4-thiadiazol-5-thione, m.p. 157°–159°C. Similarly by starting with the N-methyldithiocarbazoic acid, there was obtained 2-(5'-nitro-2'-thiothiazolyl)-4-methyl-1,3,4-thiadiazol-5-thione. By treating the N-methyldithiocarbazoic acid with phosgene, 2-mercapto-4-methyl-1,3,4-thiadiazol-5-one was obtained which was reacted with 5-nitro-2-bromothiazole to give 2-(5'-nitro-2'-thiothiazolyl)-4-methyl-1,3,4-thiadiazol-5-one. The latter compound, and the corresponding 5-thione, gave satisfactory microanalytical results.

EXAMPLE 5

Using the method of Example 1 and reacting 5-nitro-2-bromothiazole with the appropriate 5-substituted-2-mercapto-1,3,4-oxadiazole — prepared by cyclising the appropriate N-acyldithiocarbazoic acid under the influence of heat — there were obtained:

5-nitro-2-thiazolyl-5'-phenyl-2'-(1,3,4-oxadiazolyl)sulphide, m.p. 189°–191°C.

5-nitro-2-thiazolyl-5'-methyl-2'-(1,3,4-oxadiazolyl)sulphide, m.p. 86°–87°C.

5-nitro-2-thiazolyl-5'-(2''-pyridyl)-2'-(1,3,4-oxadiazolyl)sulphide, m.p. 167°–168°C.

5-nitro-2-thiazolyl-5'-(4''-pyridyl)-2'-(1,3,4-oxadiazolyl)sulphide, m.p. 188°–190°C.

EXAMPLE 6

By the method of Example 1 but reacting 5-nitro-2-bromothiazole with 3-mercapto-4-ethyl- or 4-cyclohexyl-5-phenyl-1,2,4-triazole — prepared by reaction of benzhydrazide in the presence of a base with ethylisothiocyanate or cyclohexylisothiocyanate respectively — there were obtained respectively 5-nitro-2-thiazolyl-4'-ethyl-5'-phenyl-3'-(1,2,4-triazolyl)sulphide, m.p. 128°–129°C., and 5-nitro-2-thiazolyl-4'-cyclohexyl-5'-phenyl-2'-(1,2,4-triazolyl)sulphide, m.p. 182°–184°C. Similarly 5-nitro-2-thiazolyl-4'-methyl-3'-(1,2,4-triazolyl)sulphide, m.p. 142°–144°C., was obtained.

EXAMPLE 7

By the method of Example 1 but reacting 5-nitro-2-bromothiazole with 3-methyl- or 3-ethyl-5-mercapto-1,2,4-triazole — prepared by treatment of 1-acetyl- or 1-propionyl-thiosemicarbazide respectively with sodium methoxide — there were obtained respectively 5-nitro-2-thiazolyl-3'-methyl-5'-(1,2,4-triazolyl)sulphide, m.p. 194°–196°C., and 5-nitro-2-thiazolyl-3'-ethyl-5'-(1,2,4-triazolyl)sulphide, m.p. 184°–186°C.

Similarly by using 3-amino-4-phenyl-5-mercapto-1,2,4-triazole — prepared by ring closure of N-phenyl-N'-guanidinethiourea with sodium hydroxide — there was obtained 5-nitro-2-thiazolyl-3'-amino-4'-phenyl-5'-(1,2,4-triazolyl)sulphide, m.p. 158°–160°C.

EXAMPLE 8

In the same manner as described in Examples 1 to 7, the following compounds of formula I were prepared:

5-nitro-2-thiazolyl-1'-phenyl-5'-(1,2,3,4-tetrazolyl)sulphide, m.p. 125°–126°C.

5-nitro-2-thiazolyl-1'-methyl-5'-(1,2,3,4-tetrazolyl)sulphide, m.p. 135°–136°C.

5-nitro-2-thiazolyl-5'-(1,2,3,4-tetrazolyl)sulphide, m.p. 119°–121°C.

5-nitro-2-thiazolyl-5',6'-diphenyl-3'-(1,2,4-triazinyl)sulphide, m.p. 177°–179°C. (prepared from the corresponding 3-mercaptotriazine which was in turn obtained by heating benzil with thiosemicarbazide in acetic acid)

5-nitro-2-thiazolyl-4'-quinazolinyl sulphide, m.p. 214°–216°C. (prepared from 4-mercaptoquinazoline which was obtained by heating the corresponding 4-chloro compound with sodium hydrogen sulphide)

5-nitro-2-thiazolyl-2'-pyrimidinyl sulphide, m.p. 140°–141°C.

5-nitro-2-thiazolyl-4'-methyl-2'-pyrimidinyl sulphide, m.p. 119°–120°C.

5-nitro-2-thiazolyl-4',6'-diamino-2'-pyrimidinyl sulphide, m.p. 244°–246°C.

5-nitro-2-thiazolyl-4',6'-dimethyl-2'-pyrimidinyl sulphide, m.p. 187°–188°C.

5-nitro-2-thiazolyl-4'-methyl-6'-hydroxy-2'-pyrimidinyl sulphide, m.p. 217°–218°C.

5-nitro-2-thiazolyl-4'-piperidino-2'-pyrimidinyl sulphide, m.p. 186°–187°C.

5-nitro-2-thiazolyl-2'-pyridyl sulphide, m.p. 137°–138°C.

5-nitro-2-thiazolyl-4'-pyridyl sulphide, m.p. 49°–50°C.

5-nitro-2-thiazolyl-2'-(pyridyl-N-oxide)sulphide, m.p. 131°–132°C.

5-nitro-2-thiazolyl-5'-nitro-2-pyridyl sulphide, m.p. 191°–192°C.

5-nitro-2-thiazolyl-2'-quinolyl sulphide, m.p. 187°–189°C.

5-nitro-2-thiazolyl-5'-thioisopropyl-2'-(1,3,4-thiadiazolyl) sulphide, m.p. 84°–85°C.

5-nitro-2-thiazolyl-5'-thio propargyl-2'-(1,3,4-thiadiazolyl) sulphide, m.p. 89°–91°C.

5-nitro-2-thiazolyl-5'-($\beta$-hydroxyethylthio)-2'-(1,3,4-thiadiazolyl) sulphide, m.p. 90°–92°C.

5-nitro-2-thiazolyl-5'-thioisobutyl-2'-(1,3,4-thiadiazolyl) sulphide, m.p. 57°–58°C.

5-nitro-2-thiazolyl-5'-mercapto-2'-(1,3,4-thiadiazolyl) sulphide, m.p. 300°C.

5-nitro-2-thiazolyl-5'-thio-n-propyl-2'-(1,3,4-thiadiazolyl) sulphide, m.p. 76°–77°C.

The following Examples illustrate plant fungicidal compositions for use in accordance with the present invention:

EXAMPLE 9

|  | % by Weight |
|---|---|
| 5-nitro-2-thiazolyl-5'-methyl-2'-(1,3,4-thiadiazolyl) sulphide | 40 |
| Sodium lauryl sulphate | 8 |
| Isooctyl phenyl polyethoxyethanol | 6 |
| China clay | 46 |

The above ingredients were mixed to form a wettable powder concentrate. In use, this concentrate is diluted with water to form a spray composition containing from 300 to 600 p.p.m. of active ingredient.

EXAMPLE 10

An emulsifiable concentrate containing the following ingredients was prepared:

|  | % by Weight |
|---|---|
| 5-nitro-2-thiazolyl-5'-thiomethyl-2'-(1,3,4-thiadiazolyl) sulphide | 20 |
| Sodium alkyl aryl sulphonate blend | 7 |
| Polyoxyethylene sorbitan monolaurate | 5 |
| Xylene | 68 |

This concentrate is diluted prior to use with water to form a sprayable emulsion containing from 200 to 400 p.p.m. of active ingredient.

EXAMPLE 11

An emulsifiable concentrate having the following ingredients was prepared:

|  | % by Weight |
|---|---|
| 5-nitro-2-thiazolyl-5'-methyl-2'-(1,3,4-oxadiazolyl) sulphide | 40 |
| Mixture of anionic and nonionic emulsifiers | 16 |
| Acetone | 44 |

This concentrate is diluted prior to use with water to form a sprayable composition containing from 400 to 800 p.p.m. of active ingredient.

EXAMPLE 12

A wettable powder concentrate was prepared by mixing the following ingredients:

|  | % by Weight |
|---|---|
| 5-nitro-2-thioazolyl-5'-thioisopropyl-2'-(1,3,4-thiadiazolyl) sulphide | 80 |
| Anionic surfactant | 10 |
| Kaolin | 10 |

In use, this powder is dispersed in water to form a composition containing from 600 to 1,000 p.p.m. of active ingredient.

The following Examples illustrate pharmaceutical compositions containing as active ingredient a compound of formula 1:

EXAMPLE 13

A washable ointment having the following composition was prepared:

| | |
|---|---|
| 5-nitro-2-thioazolyl-5'-thioallyl-2'-(1,3,4-thiadiazolyl) sulphide | 1.0 g. |
| Polyethylene glycol 400 | 50.0 g. |
| Polyethylene glycol 4000 | 49.0 g. |

The polyethylene glycol 4,000 was heated until molten and the polyethylene glycol 400 added with stirring to give a homogenous mixture. Into this, the active ingredient was incorporated and the mixture stirred until cool.

EXAMPLE 14

A dusting powder was prepared as follows:

| | |
|---|---|
| 5-nitro-2-thiazolyl-1'-phenyl-5'-(1,2,3,4-tetrazolyl) sulphide | 0.5 g. |
| Magnesium carbonate | 5.0 g. |
| Calcium carbonate | 10.0 g. |
| Zinc oxide | 5.0 g. |
| Talc | to 100.0 g. |

The active ingredient was triturated with the calcium carbonate and the magnesium carbonate and zinc oxide added with thorough mixing. The talc was then added and, after being well mixed, the resultant powder was sieved through a 60 mesh British Standard sieve.

EXAMPLE 15

A cream containing the following components was prepared:

| | |
|---|---|
| 5-nitro-2-thiazolyl-2'-pyrimidinyl sulphide | 2.0 g. |
| Cetostearyl alcohol | 8.5 g. |
| Sodium lauryl sulphate | 0.9 g. |
| White soft paraffin | 15.0 g. |
| Liquid paraffin | 6.0 g. |
| Distilled water | to 100.0 g. |

The cetostearyl alcohol and sodium lauryl sulphate were heated together to 70°C. The paraffins were added and the mixture stirred until homogenous, the temperature being maintained at about 55°C. The active ingredient was incorporated into the oily mixture and then water at the same temperature was added slowly with constant stirring which was continued until the resultant cream was cold.

EXAMPLE 16

Tablets having the following ingredients were prepared:

| | Per Tablet |
|---|---|
| 5-nitro-2-thiazolyl-5'-thioisopropyl-2'-1,3,4-thiadiazolyl) sulphide | 100 mg. |
| Starch | 50 mg. |
| Lactose | 35 mg. |
| Ethyl cellulose (as 20% solution in industrial alcohol) | 3 mg. |
| Alginic acid | 8 mg. |
| Magnesium stearate | 2 mg. |
| Talc | 2 mg. |
| | 200 mg. |

The active ingredient, starch and lactose were thoroughly mixed and the solution of ethyl cellulose added. The resultant powder was sieved through a No. 12 British Standard screen. The granules produced were dried, the remaining ingredients added and, after thorough mixing, the mixture was compressed into tablets each containing 100 mg. of active ingredient.

EXAMPLE 17

Capsules having the following ingredients were prepared:

|  | Per Capsule |
| --- | --- |
| 5-nitro-2-thiazolyl-5'-thio-n-propyl-2'-(1,3,4-thiadiazolyl) sulphide | 250 mg. |
| Lactose | 48 mg. |
| Magnesium stearate | 2 mg. |

The ingredients were thoroughly mixed, sieved through a No. 44 British Standard screen and filled into hard gelatin capsules in 250 mg. quantities. We claim:

1. Compound having the formula

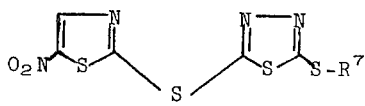

wherein $R^7$ is hydrogen, $C_{1-10}$ alkyl, allyl, propargyl, β-hydroxyethyl, benzyl, N,N-dimethylthiocarbamyl or N,N-diethylthiocarbamyl.

2. Compound having the formula

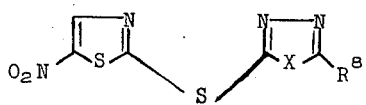

wherein X is S, O, $NR^9$, $R^8$ is hydrogen, $C_{1-4}$ alkyl, phenyl, amino, dimethylamino, diethylamino, 2-pyridyl or 4-pyridyl and $R^9$ is hydrogen, $C_{1-4}$ alkyl, phenyl or cyclohexyl.

3. Compound as claimed in claim 1, said compound being selected from 5-nitro-2-thiazolyl-5'-thiomethyl-2'-(1,3,4-thiadiazolyl) sulphide, 5-nitro-2-thiazolyl-5'-thioethyl-2'-(1,3,4-thiadiazolyl) sulphide, 5-nitro-2-thiazolyl-5'-thio-n-propyl-2'-(1,3,4-thiadiazolyl) sulphide, 5-nitro-2-thiazolyl-5'-thioisopropyl-2'-(1,3,4-thiadiazolyl) sulphide and 5-nitro-2-thiazolyl-5'-(N,N-dimethylthiocarbamylthio)-2'-(1,3,4-thiadiazolyl) sulphide.

4. Compound as claimed in claim 2, said compound being 5-nitro-2-thiazolyl-5'-methyl-2'-(1,3,4-thiadiazolyl) sulphide.

* * * * *